United States Patent
Yu et al.

(10) Patent No.: US 9,569,379 B1
(45) Date of Patent: Feb. 14, 2017

(54) METHOD FOR BURNING DATA INTO TIRE PRESSURE MONITORING DEVICE

(71) Applicant: CUB ELECPARTS INC., Fuxing Township, Changhua County (TW)

(72) Inventors: San-Chuan Yu, Fuxing Township, Changhua County (TW); Tsan-Nung Wang, Fuxing Township, Changhua County (TW); Tzu-Wen Ko, Changhua (TW); Chao-Ching Hu, Tainan (TW); Chi-Hung Chen, Fuxing Township, Changhua County (TW)

(73) Assignee: CUB ELECPARTS INC., Changhua County (TW)

( * ) Notice: Subject to any disclaimer, the term of this patent is extended or adjusted under 35 U.S.C. 154(b) by 0 days.

(21) Appl. No.: 15/066,844

(22) Filed: Mar. 10, 2016

(51) Int. Cl.
| | |
|---|---|
| *G06F 13/00* | (2006.01) |
| *G06F 13/16* | (2006.01) |
| *G06F 13/24* | (2006.01) |
| *G01M 17/02* | (2006.01) |
| *B60C 23/00* | (2006.01) |
| *B60C 23/04* | (2006.01) |

(52) U.S. Cl.
CPC ......... *G06F 13/1668* (2013.01); *B60C 23/001* (2013.01); *G01M 17/02* (2013.01); *G06F 13/24* (2013.01); *B60C 23/0471* (2013.01); *B60W 2530/20* (2013.01)

(58) Field of Classification Search
CPC ............................ G06F 13/24; B60C 23/0471
See application file for complete search history.

(56) References Cited

U.S. PATENT DOCUMENTS

| | | | |
|---|---|---|---|
| 2008/0094198 A1* | 4/2008 | Yu | B60C 23/0471 340/447 |
| 2013/0226403 A1* | 8/2013 | Zhang | G01M 17/02 701/36 |
| 2015/0202932 A1* | 7/2015 | Kessler | B60C 23/04 340/445 |

* cited by examiner

*Primary Examiner* — Zachary K Huson
(74) *Attorney, Agent, or Firm* — Muncy, Geissler, Olds & Lowe, P.C.

(57) ABSTRACT

A method for burning data into a tire pressure monitoring device includes the steps of preparing a burning tool and a tire pressure monitoring device and connecting them electrically with a single wire to enable data or signal transmission between the burning tool and the tire pressure monitoring device, thereby achieving single-wire data burning and two-way communication between the burning tool and the tire pressure monitoring device.

12 Claims, 5 Drawing Sheets

| 0 | 0 | 1 | 0 | C | 0 | 0 | 0 |

METHOD FOR BURNING DATA INTO TIRE PRESSURE MONITORING DEVICE

BACKGROUND OF THE INVENTION

1. Technical Field

The present invention relates to a technique of burning data into a tire pressure monitoring device and more particularly to a method for burning data into a tire pressure monitoring device through a single wire.

2. Description of Related Art

To enhance car and driving safety, it is now common practice to additionally install a tire pressure monitoring system (TPMS) and related devices into a car. The system includes a tire pressure detector, equipped with either a pointer indicator or an electronic display, for measuring in real time the pressure, temperature, and so on of each tire of a car before the car is started or while the car is running, thereby ensuring the driver's and passengers' safety on the road.

Currently, most tire pressure monitoring systems are configured for two-wire data burning. That is to say, a typical tire pressure monitoring device and a typical burning tool for burning programs into the tire pressure monitoring device are each provided with a transmission port (TX) for transmitting data to the other and a receiving port (RX) for receiving data from the other, and because of that, two data lines are required, each connecting a corresponding pair of transmission port and receiving port. The two ports at the ends of each data line are dedicated to data transmission and data reception respectively.

As it is often desirable to increase the data transmission/receiving ports between the burning tool and the tire pressure monitoring device, the additional ports are bound to raise the port installation cost of the tire pressure monitoring device. Moreover, in order for the burning tool to set the tire pressure monitoring device into the program burning mode, the tire pressure monitoring device must be in the initialization state or a state in which all abnormal conditions have been eliminated. In other words, program burning cannot begin until the data lines are properly connected between the burning tool and the tire pressure monitoring device, or more particularly between the corresponding transmission/receiving ports, which is very inconvenient to program editors. Hence, the conventional method for burning data into a tire pressure monitoring device demands improvement.

BRIEF SUMMARY OF THE INVENTION

In view of the aforesaid drawbacks of the prior art, it is an objective of the present invention to provide a method for burning data into a tire pressure monitoring device according to which only one wire is required to electrically connect a burning tool and a tire pressure monitoring device to enable data or signal transmission therebetween, so that single-wire data burning and two-way communication between the burning tool and the tire pressure monitoring device can be achieved.

To this end, the present invention provides a method for burning data into a tire pressure monitoring device wherein the method includes the following steps:

Step S1: A burning tool and a tire pressure monitoring device are prepared. The burning tool has a first microprocessor and a first memory unit. The first microprocessor is electrically connected to the first memory unit. The first memory unit has a clock calculation program and certain data to be written into the tire pressure monitoring device (hereinafter referred to as to-be-written data). The tire pressure monitoring device has a second microprocessor, a second memory unit, and a register. The second microprocessor is separately and electrically connected to the second memory unit and the register.

Step S2: The first microprocessor of the burning tool is electrically connected to the second microprocessor of the tire pressure monitoring device by only one wire. Each of the burning tool and the tire pressure monitoring device has a ground line.

Step S3: The first microprocessor of the burning tool transmits a reset instruction to the second microprocessor of the tire pressure monitoring device in order to switch the second microprocessor from an execution mode to an error detection mode.

Step S4: The first microprocessor transmits a clock instruction to the second microprocessor. The second microprocessor generates a predetermined pulse signal according to the clock instruction and sends the predetermined pulse signal to the first microprocessor. The clock calculation program of the first microprocessor calculates the predetermined pulse signal to obtain a working clock of the second microprocessor, in order for the first microprocessor to perform subsequent steps according to the working clock.

Step S5: The first microprocessor transmits a state instruction to the second microprocessor, and in reply, the second microprocessor sends a busy signal or a wait signal to the first microprocessor according to the state instruction. The first microprocessor keeps performing step S5 when receiving the busy signal and goes on to step S6 when receiving the wait signal.

Step S6: When receiving the wait signal, the first microprocessor generates a write-in instruction and transmits the write-in instruction to the second microprocessor. The second microprocessor is switched to a to-be-written-into state according to the write-in instruction and points to a starting position in the second memory unit where data are to be written.

Step S7: The first microprocessor transmits the to-be-written data in the first memory unit to the second microprocessor and begins a writing operation according to the starting position in the second memory unit of the second microprocessor where data are to be written.

Step S8: After performing the writing operation on the second memory unit of the second microprocessor for a predetermined data length, the first microprocessor generates an inquiry instruction and transmits the inquiry instruction to the second microprocessor. In reply, the second microprocessor sends a response signal to the first microprocessor in order for the first microprocessor to determine according to the voltage level of the response signal whether the to-be-written data have been written completely into the second memory unit. The first microprocessor goes on to step S9 when determining according to the response signal that the to-be-written data have yet to be written completely into the second memory unit. The first microprocessor goes on to step S10 when determining according to the response signal that the to-be-written data have been written completely into the second memory unit.

Step S9: The first microprocessor generates a forced interrupt instruction and transmits the forced interrupt instruction to the second microprocessor. As a result, the writing operation performed by the first microprocessor on the second memory unit of the second microprocessor is forced to stop, and step S11 is performed.

Step S10: The first microprocessor generates an ending instruction and transmits the ending instruction to the second microprocessor in order for the second microprocessor to terminate the to-be-written-into state according to the ending instruction.

Step S11: The first microprocessor generates a restoring instruction and transmits the restoring instruction to the second microprocessor to restore the second microprocessor from the error detection mode to the execution mode.

Preferably, in step S8, the second microprocessor does not send the response signal to the first microprocessor until the second microprocessor knows from the inquiry instruction the actual write-in state of the to-be-written data in the second memory unit.

Preferably, in step S10, the first microprocessor further generates a verification instruction and transmits the verification instruction to the second microprocessor to verify the correctness of the to-be-written data in the second memory unit in comparison with the to-be-written data in the first memory unit. When the verification result is negative, the process goes back to step S3.

Preferably, in step S10, the first microprocessor further generates a confirmation instruction and transmits the confirmation instruction to the second microprocessor to confirm the correctness of location of the to-be-written data in the second memory unit. When the location is incorrect, the process returns to step S3.

Preferably, the method further includes step X, in which the first microprocessor further generates a reading instruction and transmits the reading instruction to the second microprocessor in order to read data from the register and know from the data read how data are arranged in the second memory unit. The first microprocessor then determines whether it is appropriate to perform the writing operation on the second memory unit of the second microprocessor. Step X can be performed in any interval between steps S6 and S10. When step X is to be repeated, it can be carried out separately in the interval between steps S6 and S7, the interval between steps S7 and S8, the interval between steps S8 and S9, and the interval between steps S8 and S10.

The present invention also provides a tire pressure monitoring system, whose structure, operational features, and anticipated effects will be detailed below.

DETAILED DESCRIPTION OF THE INVENTION

The structural features and anticipated effects of the present invention are described below in detail with reference to some illustrative embodiments and the accompanying drawings. In the following description of the embodiments and the drawings, the same or similar elements, components, articles, structures, systems, mechanisms, devices, process flows, methods, or steps are identified by the same reference numeral.

Figure 1:
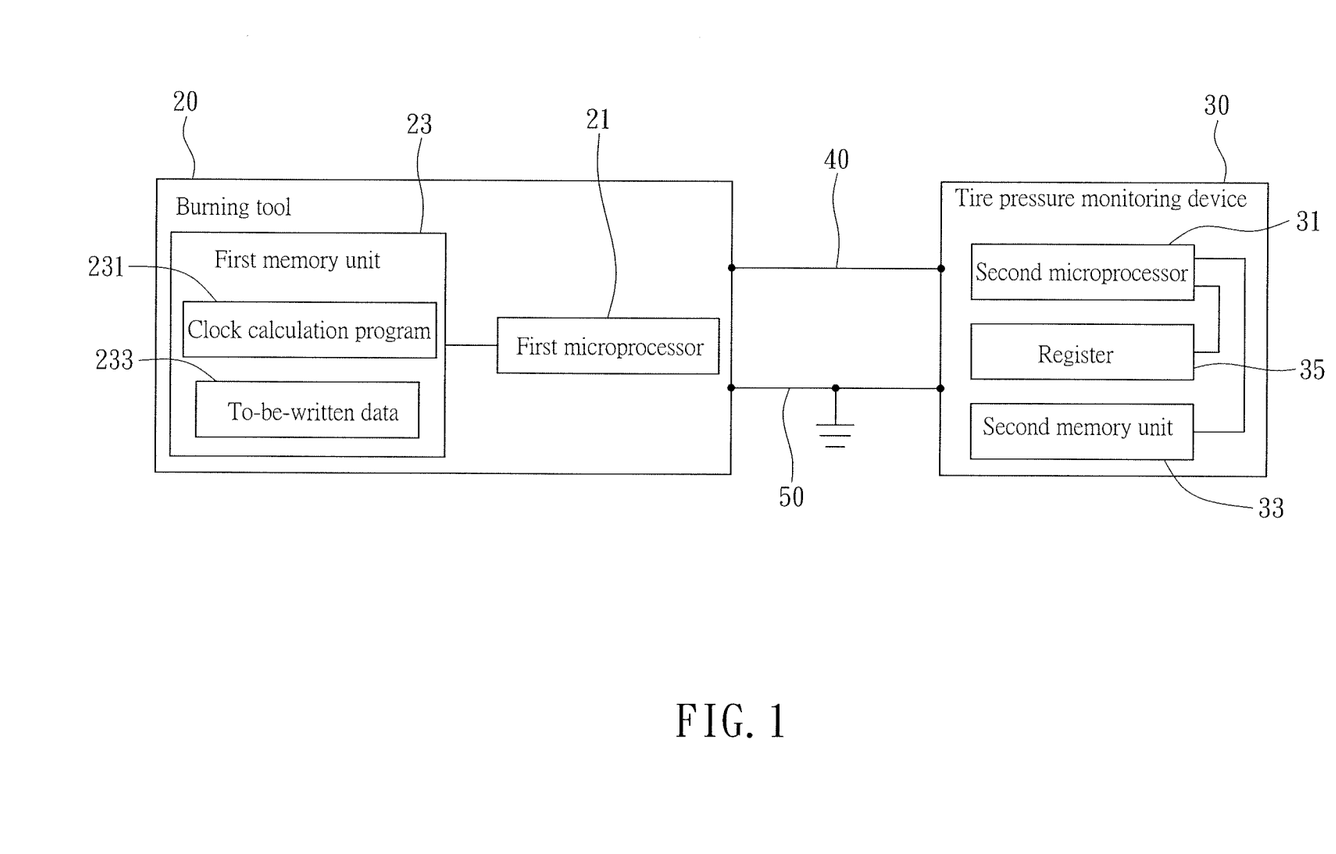
FIG. 1 is a system structural diagram of the first preferred embodiment of the present invention.

Referring to FIG. 1 to FIG. 4, the method according to the first embodiment of the present invention for burning data into a tire pressure monitoring device includes the following steps:

Step S1: A burning tool 20 and a tire pressure monitoring device 30 are prepared. The burning tool 20 has a first microprocessor 21 and a first memory unit 23. The first microprocessor 21 is electrically connected to the first memory unit 23. The first memory unit 23 has a clock calculation program 231 and certain data to be written into the tire pressure monitoring device 30 (hereinafter referred to as to-be-written data 233). The tire pressure monitoring device 30 has a second microprocessor 31, a second memory unit 33, and a register 35. The second microprocessor 31 is separately and electrically connected to the second memory unit 33 and the register 35. In the first preferred embodiment of the present invention, the tire pressure monitoring device 30 is configured to be mounted to at least one tire (not shown) of a car (not shown).

Step S2: The first microprocessor 21 of the burning tool 20 is electrically connected to the second microprocessor 31 of the tire pressure monitoring device 30 by a single wire 40. The burning tool 20 and the tire pressure monitoring device 30 each have a ground line 50.

Figure 4:
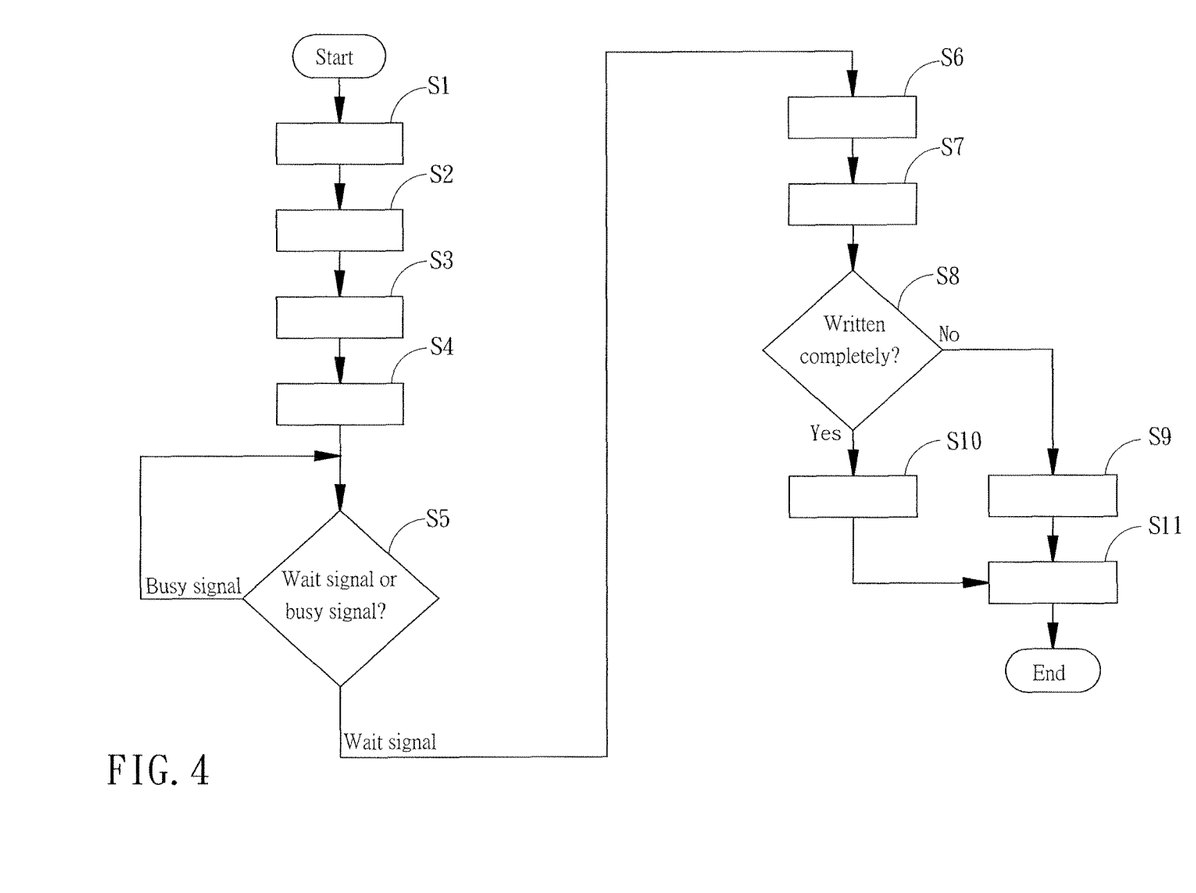
FIG. 4 is the flowchart of the first preferred embodiment of the present invention.

Step S3: The first microprocessor 21 of the burning tool 20 transmits a reset instruction to the second microprocessor 31 of the tire pressure monitoring device 30 to switch the second microprocessor 31 from an execution mode to an error detection mode. In the first preferred embodiment of the present invention, the execution mode is a mode in which a user or program editor can execute predetermined instructions and operations, and the error detection mode is a mode in which a user or program editor can edit, compile, or control the time sequence of, those instructions and operations.

Step S4: The first microprocessor 21 transmits a clock instruction to the second microprocessor 31, and the second microprocessor 31 generates a predetermined pulse signal according to the clock instruction and sends the predetermined pulse signal to the first microprocessor 21. The first microprocessor 21 calculates the predetermined pulse signal with the clock calculation program 231 in order to obtain a working clock of the second microprocessor 31 and perform the following steps according to the working clock obtained.

Step S5: The first microprocessor 21 transmits a state instruction to the second microprocessor 31, and based on the state instruction, the second microprocessor 31 sends a busy signal or a wait signal to the first microprocessor 21. When receiving the busy signal, the first microprocessor 21 continues performing step S5; when receiving the wait signal, the first microprocessor 21 performs step S6 that follows.

Step S6: When receiving the wait signal, the first microprocessor 21 generates a write-in instruction and transmits the write-in instruction to the second microprocessor 31. The second microprocessor 31 is switched to a to-be-written-into state according to the write-in instruction and points to a starting position 333 in the second memory unit 33 where data are to be written.

Figure 2:
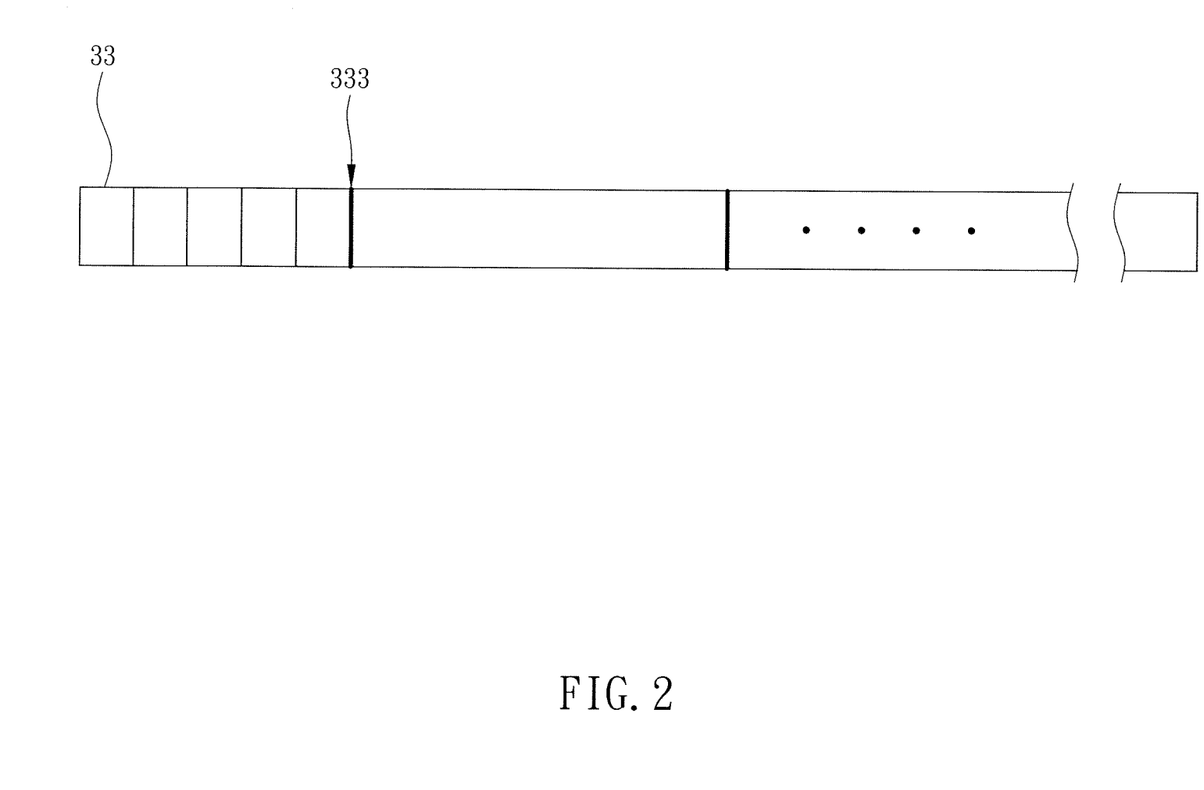
FIG. 2 is a partial structural diagram of the first preferred embodiment of the present invention.
Figure 3:
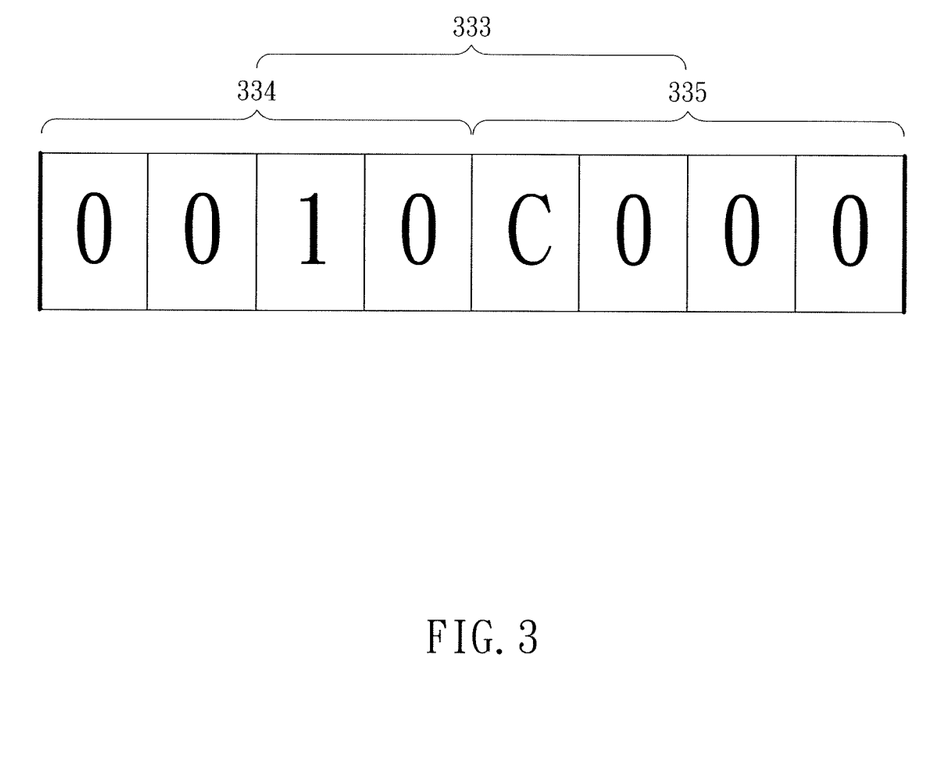
FIG. 3 is another partial structural diagram of the first preferred embodiment of the present invention.

In the first preferred embodiment of the present invention, referring to FIG. 2 and FIG. 3, the starting position 333 in the second memory unit 33 where data are to be written can be programmed as a combination of an instruction code 334 and an address code 335. In this preferred embodiment for example, the instruction code 334 of the starting position 333 is set as "0010", and the address code 335 of the starting position 333, as "C000". Therefore, the starting position 333 in the second memory unit 33 where data are to be written has the coded address "001C000", and the second microprocessor 31 points to this coded address "0010C000" in the second memory unit 33 as the starting position 333. This ensures the correctness of the address into which the to-be-written data 233 are to be written.

Step S7: The first microprocessor 21 transmits the to-be-written data 233 in the first memory unit 23 to the second microprocessor 31 and begins a writing operation according to the starting position 333 in the second memory unit 33 where data are to be written.

Step S8: Once the first microprocessor 21 has performed the writing operation on the second memory unit 33 of the second microprocessor 31 for a predetermined data length, the first microprocessor 21 generates an inquiry instruction and transmits the inquiry instruction to the second microprocessor 31. In reply, the second microprocessor 31 sends a response signal to the first microprocessor 21 in order for the first microprocessor 21 to determine according to the voltage level of the response signal whether the to-be-written data 233 have been written completely into the second memory unit 33. When determining according to the response signal that the to-be-written data 233 have not been written completely into the second memory unit 33, the first microprocessor 21 performs step S9. When determining according to the response signal that the to-be-written data 233 have been written completely into the second memory unit 33, the first microprocessor 21 performs step S10.

Step S9: When determining that the to-be-written data 233 have not been written completely into the second memory unit 33, the first microprocessor 21 generates a forced interrupt instruction and transmits the forced interrupt instruction to the second microprocessor 31. Thus, the writing operation performed by the first microprocessor 21 on the second memory unit 33 of the second microprocessor 31 is forced to stop. Then, step S11 is performed.

Step S10: When determining that the to-be-written data 233 have been written completely into the second memory unit 33, the first microprocessor 21 generates an ending instruction and transmits the ending instruction to the second microprocessor 31 in order for the second microprocessor 31 to terminate the to-be-written-into state according to the ending instruction. Then, step S11 is performed.

Step S11: The first microprocessor 21 generates a restoring instruction and transmits the restoring instruction to the second microprocessor 31 to restore the second microprocessor 31 from the error detection mode to the execution mode.

According to the above, the first preferred embodiment of the present invention is significantly advantageous over the prior art in the following ways:

First, the number of data transmission/receiving ports is reduced. Since data or signal transmission between the burning tool 20 and the tire pressure monitoring device 30 is enabled by only one wire 40, which electrically connects the first microprocessor 21 of the burning tool 20 and the second microprocessor 31 of the tire pressure monitoring device 30, the data transmission/receiving ports required between the burning tool 20 and the tire pressure monitoring device 30 are fewer than in the prior art.

Second, synchronous data transmission is achieved. Once the burning tool 20 obtains the working clock of the tire pressure monitoring device 30 through the clock calculation program 231, the first microprocessor 21 of the burning tool 20 performs all subsequent data transmission according to the working clock.

Third, two-way communication is established. The first microprocessor 21 of the burning tool 20 and the second microprocessor 31 of the tire pressure monitoring device 30 can send instructions or signals to, and respond to the instructions or signals sent by, each other such that two-way communication between the burning tool 20 and the tire pressure monitoring device 30 is achieved.

The technical features and effects of the first preferred embodiment of the present invention have been detailed above. The following paragraphs are devoted to those of the second preferred embodiment.

Figure 5:
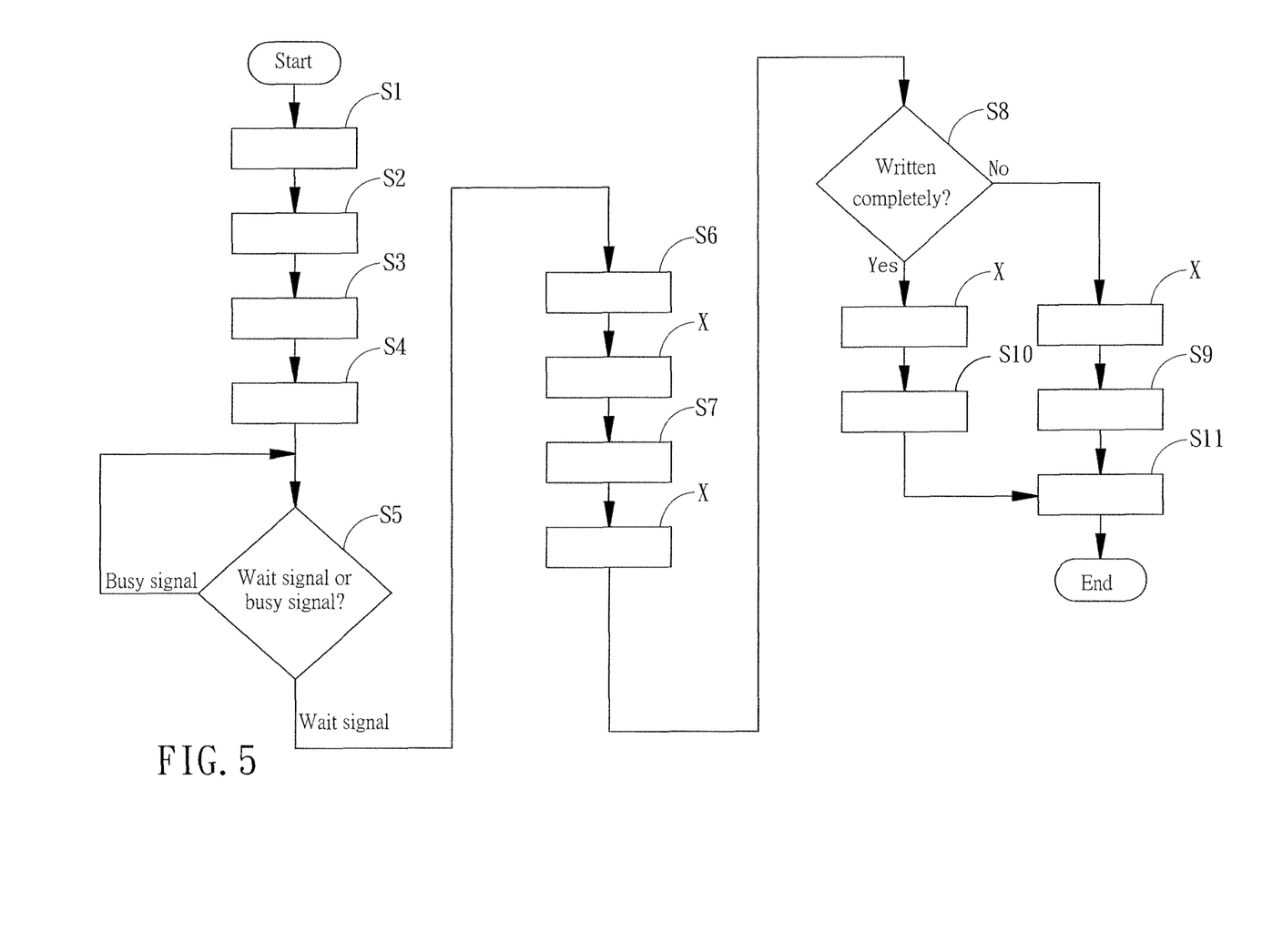
FIG. 5 is the flowchart of the second preferred embodiment of the present invention.

Referring to FIG. 5 in conjunction with FIG. 1 for the method according to the second preferred embodiment of the present invention for burning data into a tire pressure monitoring device, the steps of this data burning method are the same as those in the previous embodiment except for the following:

In step S8, the second microprocessor 31 sends the response signal to the first microprocessor 21 only after the second microprocessor 31 knows from the inquiry instruction the actual write-in state of the to-be-written data 233 in the second memory unit 33.

In step S10, the first microprocessor 21 generates a verification instruction and transmits the verification instruction to the second microprocessor 31 to verify the correctness of the to-be-written data 233 in the second memory unit 33 in comparison with the to-be-written data 233 in the first memory unit 21. When the verification result is negative, step S3 is performed again.

In step S10, the first microprocessor 21 generates a confirmation instruction and transmits the confirmation instruction to the second microprocessor 31 to confirm the correctness of location of the to-be-written data 233 in the second memory unit 33. When the location is incorrect, step S3 is performed again.

The data burning method of the present invention further includes step X, in which the first microprocessor 21 generates a reading instruction and transmits the reading instruction to the second microprocessor 31 in order to read data from the register 35 and thus gain knowledge of the arrangement of data in the second memory unit 33. The first microprocessor 21 can then determine whether it is appropriate to write into the second memory unit 33 of the second microprocessor 31. Step X can be performed in any interval between step S6 and step S10. When it is desired to perform step X multiple times, it can be performed separately in the interval between steps S6 and S7, the interval between steps S7 and S8, the interval between steps S8 and S9, and the interval between steps S8 and S10.

The second preferred embodiment of the present invention has the following significant advantages over the prior art:

First, correctness of the data written is ensured. To guarantee data accuracy, the first microprocessor 21 generates the verification instruction or confirmation instruction to ensure the correctness and consistency of the location of the to-be-written data 233 written by the burning tool 20 into the second memory unit 33 of the tire pressure monitoring device 30.

Second, the writing operation continues only when the appropriateness of doing so is confirmed. The first microprocessor 21 generates the reading instruction in order to determine whether it is appropriate to continue writing into the second memory unit 33 of the second microprocessor 31. This also demonstrates the usefulness of two-way communication between the burning tool 20 and the tire pressure monitoring device 30.

Last but not least, it should be pointed out again that, as a person of ordinary skill in the art would understand, the foregoing detailed description and embodiments are provided only to shed light on the structure, methods, process flows, and anticipated effects of the present invention and are not intended to be restrictive of the scope of the invention. All equivalent substitutions and variations of elements, components, articles, structures, devices, methods, and process flows should fall within the scope of the invention.

What is claimed is:

1. A method for burning data into a tire pressure monitoring device, comprising the steps of:

S1: preparing a burning tool and a tire pressure monitoring device, wherein the burning tool has a first microprocessor and a first memory unit, the first microprocessor is electrically connected to the first memory unit, and the first memory unit has a clock calculation program and to-be-written data; and wherein the tire pressure monitoring device has a second microprocessor, a second memory unit, and a register, and the second microprocessor is separately and electrically connected to the second memory unit and the register;

S2: electrically connecting the first microprocessor of the burning tool to the second microprocessor of the tire pressure monitoring device by only one wire, wherein each of the burning tool and the tire pressure monitoring device has a ground line;

S3: transmitting a reset instruction to the second microprocessor of the tire pressure monitoring device by the first microprocessor of the burning tool in order to switch the second microprocessor from an execution mode to an error detection mode;

S4: transmitting a clock instruction to the second microprocessor by the first microprocessor in order for the second microprocessor to generate a predetermined pulse signal according to the clock instruction and send the predetermined pulse signal to the first microprocessor, for the clock calculation program of the first microprocessor to calculate the predetermined pulse signal and thereby obtain a working clock of the second microprocessor, and for the first microprocessor to perform subsequent steps according to the working clock;

S5: transmitting a state instruction to the second microprocessor by the first microprocessor in order for the second microprocessor to send a busy signal or a wait signal to the first microprocessor according to the state instruction, and for the first microprocessor to continue performing the step S5 upon receiving the busy signal and perform a step S6 upon receiving the wait signal;

S6: generating a write-in instruction and transmitting the write-in instruction to the second microprocessor, by the first microprocessor upon receiving the wait signal, so that the second microprocessor is switched to a to-be-written-into state according to the write-in instruction and points to a starting position in the second memory unit where data are to be written;

S7: transmitting the to-be-written data in the first memory unit to the second microprocessor by the first microprocessor, and starting a writing operation of the first microprocessor according to the starting position in the second memory unit of the second microprocessor where data are to be written;

S8: generating an inquiry instruction and transmitting the inquiry instruction to the second microprocessor, by the first microprocessor after performing the writing operation on the second memory unit of the second microprocessor for a predetermined data length, in order for the second microprocessor to send a response signal to the first microprocessor, for the first microprocessor to determine according to a voltage level of the response signal whether the to-be-written data have been written completely into the second memory unit, for the first microprocessor to perform a step S9 when determining according to the response signal that the to-be-written data have not been written completely into the second memory unit, and for the first microprocessor to perform a step S10 when determining according to the response signal that the to-be-written data have been written completely into the second memory unit;

S9: generating a forced interrupt instruction and transmitting the forced interrupt instruction to the second microprocessor, by the first microprocessor, so that the writing operation performed by the first microprocessor on the second memory unit of the second microprocessor is forced to stop and a step S11 is performed;

S10: generating an ending instruction and transmitting the ending instruction to the second microprocessor, by the first microprocessor, in order for the second microprocessor to terminate the to-be-written-into state according to the ending instruction; and S11: generating a restoring instruction and transmitting the restoring instruction to the second microprocessor, by the first microprocessor, in order to restore the second microprocessor from the error detection mode to the execution mode.

2. The method of claim 1, wherein in the step S8, the second microprocessor sends the response signal to the first microprocessor only after the second microprocessor knows from the inquiry instruction an actual write-in state of the to-be-written data in the second memory unit.

3. The method of claim 2, wherein the step S10 further comprises generating a verification instruction and transmitting the verification instruction to the second microprocessor, by the first microprocessor, in order to verify correctness of the to-be-written data in the second memory unit in comparison with the to-be-written data in the first memory unit, and the step S3 is performed again when a negative verification result is obtained.

4. The method of claim 3, wherein the step S10 further comprises generating a confirmation instruction and transmitting the confirmation instruction to the second microprocessor, by the first microprocessor, in order to confirm correctness of location of the to-be-written data in the second memory unit, and the step S3 is performed again when the location is incorrect.

5. The method of claim 2, wherein the step S10 further comprises generating a confirmation instruction and transmitting the confirmation instruction to the second microprocessor, by the first microprocessor, in order to confirm correctness of location of the to-be-written data in the second memory unit, and the step S3 is performed again when the location is incorrect.

6. The method of claim 1, wherein the step S10 further comprises generating a verification instruction and transmitting the verification instruction to the second microprocessor, by the first microprocessor, in order to verify correctness of the to-be-written data in the second memory unit in comparison with the to-be-written data in the first memory unit, and the step S3 is performed again when a negative verification result is obtained.

7. The method of claim 1, further comprising at least one step X of generating a reading instruction and transmitting the reading instruction to the second microprocessor, by the first microprocessor, in order for the first microprocessor to read data from the register, to know from the data read how data in the second memory unit are arranged, and to determine whether it is appropriate for the first microprocessor to perform the writing operation on the second memory unit of the second microprocessor, wherein the at least one step X, if singular, is performed in an interval between the steps S6 and S10 and, if plural, is performed respectively in a corresponding number of intervals selected from the group consisting of an interval between the steps S6 and S7, an interval between the steps S7 and S8, an interval between the steps S8 and S9, and an interval between the steps S8 and S10.

8. The method of claim 2, further comprising at least one step X of generating a reading instruction and transmitting the reading instruction to the second microprocessor, by the first microprocessor, in order for the first microprocessor to read data from the register, to know from the data read how data in the second memory unit are arranged, and to determine whether it is appropriate for the first microprocessor to perform the writing operation on the second memory unit of the second microprocessor, wherein the at least one step X, if singular, is performed in an interval between the steps S6 and S10 and, if plural, is performed respectively in a corresponding number of intervals selected from the group consisting of an interval between the steps S6 and S7, an interval between the steps S7 and S8, an interval between the steps S8 and S9, and an interval between the steps S8 and S10.

9. The method of claim 3, further comprising at least one step X of generating a reading instruction and transmitting the reading instruction to the second microprocessor, by the first microprocessor, in order for the first microprocessor to read data from the register, to know from the data read how data in the second memory unit are arranged, and to determine whether it is appropriate for the first microprocessor to perform the writing operation on the second memory unit of the second microprocessor, wherein the at least one step X, if singular, is performed in an interval between the steps S6 and S10 and, if plural, is performed respectively in a corresponding number of intervals selected from the group consisting of an interval between the steps S6 and S7, an interval between the steps S7 and S8, an interval between the steps S8 and S9, and an interval between the steps S8 and S10.

10. The method of claim 4, further comprising at least one step X of generating a reading instruction and transmitting the reading instruction to the second microprocessor, by the first microprocessor, in order for the first microprocessor to read data from the register, to know from the data read how data in the second memory unit are arranged, and to determine whether it is appropriate for the first microprocessor to perform the writing operation on the second memory unit of the second microprocessor, wherein the at least one step X, if singular, is performed in an interval between the steps S6 and S10 and, if plural, is performed respectively in a corresponding number of intervals selected from the group consisting of an interval between the steps S6 and S7, an interval between the steps S7 and S8, an interval between the steps S8 and S9, and an interval between the steps S8 and S10.

11. The method of claim 5, further comprising at least one step X of generating a reading instruction and transmitting the reading instruction to the second microprocessor, by the first microprocessor, in order for the first microprocessor to read data from the register, to know from the data read how data in the second memory unit are arranged, and to determine whether it is appropriate for the first microprocessor to perform the writing operation on the second memory unit of the second microprocessor, wherein the at least one step X, if singular, is performed in an interval between the steps S6 and S10 and, if plural, is performed respectively in a corresponding number of intervals selected from the group consisting of an interval between the steps S6 and S7, an interval between the steps S7 and S8, an interval between the steps S8 and S9, and an interval between the steps S8 and S10.

12. The method of claim 6, further comprising at least one step X of generating a reading instruction and transmitting the reading instruction to the second microprocessor, by the first microprocessor, in order for the first microprocessor to read data from the register, to know from the data read how data in the second memory unit are arranged, and to determine whether it is appropriate for the first microprocessor to perform the writing operation on the second memory unit of the second microprocessor, wherein the at least one step X, if singular, is performed in an interval between the steps S6 and S10 and, if plural, is performed respectively in a corresponding number of intervals selected from the group consisting of an interval between the steps S6 and S7, an interval between the steps S7 and S8, an interval between the steps S8 and S9, and an interval between the steps S8 and S10.

* * * * *